(12) United States Patent
Jang et al.

(10) Patent No.: US 8,497,958 B2
(45) Date of Patent: Jul. 30, 2013

(54) REFLECTIVE DISPLAY DEVICES

(75) Inventors: Jae-eun Jang, Seoul (KR); Jae-eun Jung, Seoul (KR); Gae-hwang Lee, Hwaseong-si (KR); Young-Jae Jeon, Seoul (KR); Jin Woo Lee, Seoul (KR)

(73) Assignees: Samsung Electronics Co., Ltd., Gyeonggi-Do (KR); Konkuk University Industrial Cooperation Corp., Seoul (KR)

( * ) Notice: Subject to any disclaimer, the term of this patent is extended or adjusted under 35 U.S.C. 154(b) by 239 days.

(21) Appl. No.: 12/929,561

(22) Filed: Feb. 1, 2011

(65) Prior Publication Data
US 2012/0038852 A1    Feb. 16, 2012

(30) Foreign Application Priority Data
Aug. 11, 2010 (KR) .................. 10-2010-0077500

(51) Int. Cl.
*G02F 1/1335* (2006.01)
(52) U.S. Cl.
USPC ............. 349/113; 349/10; 349/106; 349/108

(58) Field of Classification Search
USPC .................. 349/10, 113, 106–108
See application file for complete search history.

(56) References Cited

U.S. PATENT DOCUMENTS

| 5,541,749 | A | * | 7/1996 | Konuma et al. ............... 349/106 |
| 5,680,188 | A | | 10/1997 | Yoshida et al. |
| 5,699,135 | A | * | 12/1997 | Hisatake et al. ............. 349/113 |
| 6,261,650 | B1 | | 7/2001 | Kobayashi et al. |
| 6,429,914 | B1 | * | 8/2002 | Kubota et al. .................. 349/86 |
| 2007/0173166 | A1 | * | 7/2007 | Ding et al. ....................... 445/25 |

FOREIGN PATENT DOCUMENTS

| JP | 11160682 A | 6/1999 |
| KR | 10-0181985 B1 | 1/1995 |
| KR | 0166943 | 9/1998 |
| KR | 100233992 B1 | 12/1999 |
| KR | 20050109177 A | 11/2005 |
| KR | 20070031507 A | 10/2008 |

* cited by examiner

*Primary Examiner* — Phu Vu
(74) *Attorney, Agent, or Firm* — Harness, Dickey & Pierce, P.L.C.

(57) ABSTRACT

Example embodiment are directed to a reflective display device including a polymer-dispersed liquid crystal (PDLC) layer between a first substrate and a second substrate, and a mirror reflection plate on the first substrate.

26 Claims, 5 Drawing Sheets

REFLECTIVE DISPLAY DEVICES

CROSS-REFERENCE TO RELATED APPLICATIONS

This application claims priority under 35 U.S.C. §119 to Korean Patent Application No. 10-2010-0077500, filed on Aug. 11, 2010, in the Korean Intellectual Property Office, the entire disclosure of which is incorporated herein by reference.

BACKGROUND

1. Field

Example embodiments relate to reflective display devices, and more particularly, to a reflective display devices including polymer-dispersed liquid crystals (PDLCS).

2. Description of the Related Art

Polymers and liquid crystals are uniformly distributed in polymer-dispersed liquid crystals (PDLCs). When an electric field is applied to the PDLCs, optical refractive indexes of the polymers and liquid crystals change. Therefore, PDLCs may scatter and transmit light by controlling a difference in refractive indexes of liquid crystals and polymers by the application of an electric field. Thus, the PDLCs may be effectively used in reflective display devices displaying information or an image by using an external light source.

Also, in reflective display devices including PDLCs, an absorption layer for absorbing light penetrating the PDLCs may be used. However, in a reflective display device including the absorption layer, a white color is displayed only by light scattered from the PDLCs, and thus the quality of the white color is poor. In addition, although a white reflection plate may be used in order to improve the quality of the white color, a contrast ratio is degraded in this case.

SUMMARY

According to example embodiments, a reflective display device including a plurality of pixel units, the reflective display device includes a first substrate and a second substrate apart from each other; a plurality of first and second electrodes respectively on the first and second substrates; a polymer-dispersed liquid crystal (PDLC) layer between the first and second electrodes and including a polymer, liquid crystals, and black dyes; and a mirror reflection plate on the first substrate.

According to example embodiments, molecules of the liquid crystals and the black dyes are parallel to the first and second substrates.

According to example embodiments, when a voltage is applied between the first and second electrodes, the liquid crystal molecules and the black dyes are randomly arranged.

According to example embodiments, the mirror reflection plate is on a lower surface or an upper surface of the first substrate, or is on upper surface of the plurality of first electrodes.

According to example embodiments, the reflective display device further includes a phase-difference film between the PDLC layer and the mirror reflection plate.

According to example embodiments, the phase-difference film includes a ¼ wavelength phase-difference film.

According to example embodiments, the mirror reflection plate includes a metal film or a film coated with a metal.

According to example embodiments, wherein the black dyes include a dichroic dye having an optical anisotropy.

According to example embodiments, a plurality of barrier walls are between the first substrate and the second substrate.

According to example embodiments, an adhesive material is on ends of each of the barrier walls.

According to example embodiments, the plurality of first electrodes are discrete structures that correspond to the plurality of pixel units, and the second electrodes are configured as a common electrode.

According to example embodiments, the first and second electrodes are in a stripe shape and cross each other.

According to example embodiments, a reflective display device includes a plurality of pixel units, each pixel unit includes a plurality of sub-pixels of different color, the reflective display device includes a first substrate and a second substrate from each other; a plurality of first and second electrodes respectively on the first and second substrates; a polymer-dispersed liquid crystal (PDLC) layer between the plurality of first and second electrodes and including a polymer, liquid crystals, and black dyes; a color filter on at least one of the first and second substrates, the color filter including a plurality of color filter layers of different color and the color filter corresponding to the plurality of sub-pixels; and a mirror reflection plate on the first substrate.

According to example embodiments, molecules of the liquid crystals and the black dyes are parallel to the first and second substrates.

According to example embodiments, the mirror reflection plate is on a lower surface or an upper surface of the first substrate, or is on an upper surface of the plurality of first electrodes.

According to example embodiments, the reflective display device further includes a ¼ wavelength phase-difference film between the PDLC layer and the minor reflection plate.

According to example embodiments, a plurality of barrier walls are between the first substrate and the second substrate.

According to example embodiments, the barrier walls are between the different color filter layers.

According to example embodiments, the color filter is an RGB color filter including red, green, and blue color filter layers or the color filter is a CMY color filter including cyan, magenta, and yellow color filter layers.

According to example embodiments, the plurality of first electrodes are discrete structures corresponding to the plurality of sub-pixels, and the plurality of second electrodes are configured as a common electrode.

According to example embodiments, the first and second electrodes are in a stripe shape and cross each other.

According to example embodiments, a reflective display device includes a plurality of pixel units, each pixel unit includes a plurality of sub-pixels of different color, the reflective display device includes a first substrate and a second substrate apart from each other; a plurality of first and second electrodes respectively on the first and second substrates; a plurality of different color polymer-dispersed liquid crystal (PDLC) layers corresponding to the plurality of sub-pixels, and including polymer, liquid crystals, and dyes of different colors; and a mirror reflection plate on the first substrate.

According to example embodiments, molecules of the liquid crystals and the dyes of different colors are parallel to the first and second substrates.

According to example embodiments, the mirror reflection plate is on a lower surface or an upper surface of the first substrate, or is on an upper surface of the plurality of first electrodes.

According to example embodiments, the reflective display device further includes a ¼ wavelength phase-difference film between the PDLC layer and the mirror reflection plate.

According to example embodiments, a plurality of barrier walls are between the first substrate and the second substrate, and the barrier walls are between the PDLC layers of different color.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
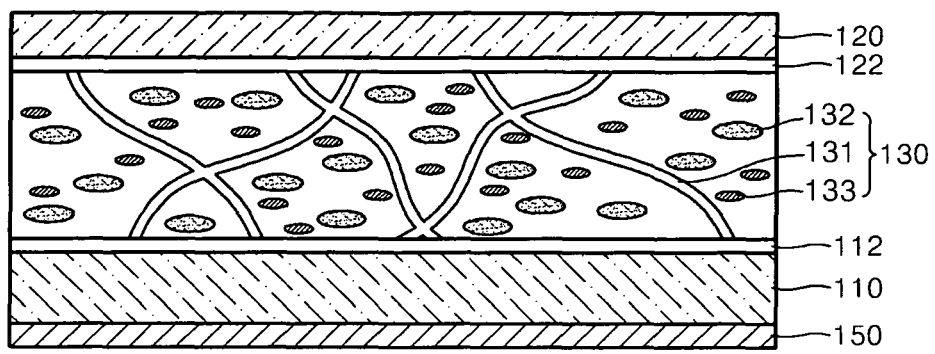
FIG. 1 is a cross-sectional view illustrating a reflective display device according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a cross-sectional view illustrating a reflective display device according to example embodiments.

Referring to FIG. 1, the reflective display device includes a plurality of pixel units. For convenience of description, only one pixel unit is illustrated in FIG. 1. In detail, the reflective display device includes first and second substrates 110 and 120 disposed apart from each other, a plurality of first and second electrodes 112 and 122 respectively formed on the first and second substrates 110 and 120, a polymer-dispersed liquid crystal (PDLC) layer 130 disposed between the first electrodes 112 and the second electrodes 122, and a mirror reflection plate 150 disposed on a lower surface of the first substrate 110.

The first substrate 110, which is a lower substrate, and the second substrate 120, which is an upper substrate, may be transparent substrates. The first and second substrates 110 and 120 may be formed of glass or plastic. However, example embodiments are not limited thereto, and the first and second substrates 110 and 120 may be formed of various other suitable materials. The plurality of first electrodes 112 are formed on the first substrate 110, and the plurality of second electrodes 122 are formed under the second substrate 120. The first and second electrodes 112 and 122 may be formed of a transparent conductive material such as indium tin oxide (ITO).

When the reflective display device, according to the example embodiments, is an active matrix (AM)-type display device, the first electrodes 112 are formed in a shape corresponding to pixel units, and the second electrodes 122 are formed as one body, thereby configuring a common electrode. In this regard, a thin-film transistor (TFT) for switching/driving the pixel units is connected to each of the first electrodes 112. Also, when the reflective display device, according to example embodiments, is a passive matrix (PM)-type display device, the first electrodes 112 may be formed parallel to one another in a stripe shape, and the second electrodes 122 may be formed parallel to one another in a stripe shape crossing the first electrodes 112.

The PDLC layer 130 is formed between the first electrodes 112 and the second electrodes 122. A polymer 131, liquid crystal including liquid crystal molecules 132, and black dyes 133 are distributed in the PDLC layer 130. According to example embodiments, the polymer 131 may have a network structure. The black dyes 133 may be a dichroic dye having an optical anisotropy.

In the example embodiments, the liquid crystal molecules 132 of the liquid crystal and the black dyes 133 distributed in the PDLC layer 130 are arranged parallel to the first and second substrates 110 and 120. In detail, when a voltage is not applied between the first and second substrates 110 and 120, the liquid crystal molecules 132 and the black dyes 133 are arranged parallel to the first and second substrates 110 and 120. As such, when the liquid crystal molecules 132 are arranged parallel to one another, refractive indexes of the polymer 131 and the liquid crystal molecules 132 become similar to each other, and thus, incident light penetrates the liquid crystal molecules 132 and the polymer 131. The black dyes 133 absorb the incident light.

The mirror reflection plate 150 is disposed on the lower surface of the first substrate 110. The mirror reflection plate 150 generates mirror reflection and may be formed of a metal film and/or a film coated with a metal. The film coated with a metal may be formed of polymer or oxide, or may be formed of any one of various materials.

Figure 2A:
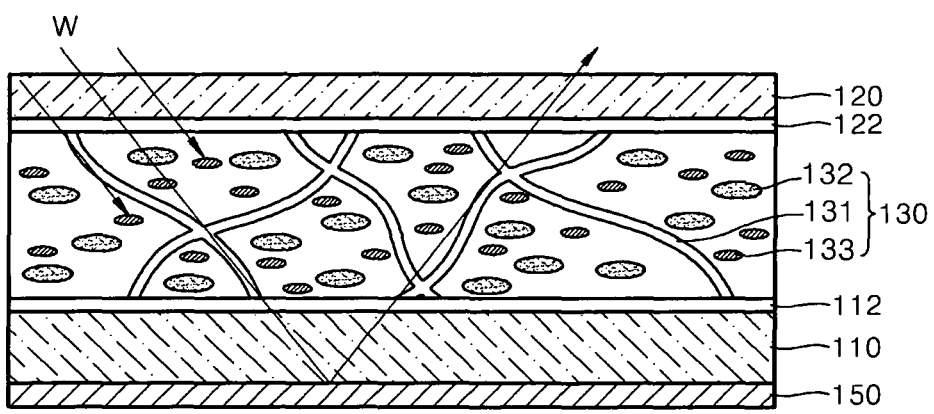
FIGS. 2A and 2B are cross-sectional views for illustrating a method of driving the reflective display device of FIG. 1.
Figure 2B:
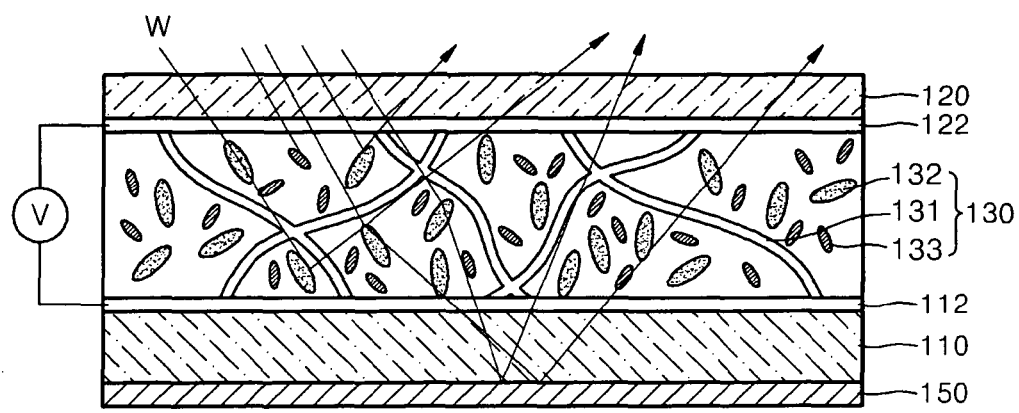

FIGS. 2A and 2B are cross-sectional views illustrating a method of driving the reflective display device of FIG. 1, according to example embodiments.

Referring to FIG. 2A, when a voltage is not applied between the first electrode 112 and the second electrode 122, the liquid crystal molecules 132 and the black dyes 133 are arranged parallel to the first and second substrates 110 and 120. Accordingly, white light W penetrating the second substrate 120, which is an upper substrate, from an external light source, for example, natural light, and incident on the polymer 131 and the liquid crystal molecules 132 penetrates the polymer 131 and the liquid crystal molecules 132. The penetrated white light W is reflected by the mirror reflection plate 150 at a given angle and is externally emitted to the outside through the second substrate 120. In this regard, the externally emitted white light is out of the range of a viewing angle of an observer. The white light W incident on the black dyes 133 from the external light source is absorbed by the black dyes 133. Thus, a pixel unit in which a voltage is not applied between the first and second electrodes 112 and 122 displays a black color.

Referring to FIG. 2B, a predetermined/desired voltage V is applied between the first electrode 112 and the second electrode 122. When an electric field is applied in the PDLC layer 130, the liquid crystal molecules 132 and the black dyes 133 try to move in parallel to the electric field. However, the liquid crystal molecules 132 and the black dyes 133 may not be completely arranged parallel to the electric field due to the network structure of the polymer 131 distributed in the PDLC layer 130 and instead may be randomly arranged. In this state, a refractive index of the polymer 131 is different from that of the liquid crystal molecules 132. Accordingly, the white light W penetrating the second substrate 120 from the external light source and incident on the polymer 131 and the liquid crystal molecules 132 is scattered in different directions. The scattered white light W is emitted externally through the second substrate 120, or is reflected by the mirror reflection plate 150 and then is externally emitted through the second substrate 120. Also, the randomly arranged black dyes 133 absorb less amount of light than the black dyes 133 arranged parallel to the first and second substrates 110 and 120. Accordingly, a pixel unit in which a voltage is applied between the first and second electrodes 112 and 122 displays a white color. As such, if the mirror reflection plate 150 is used on the first substrate 110, a characteristic of a white color may be further improved than when a conventional absorption layer is used on the first substrate 110.

Figure 3:
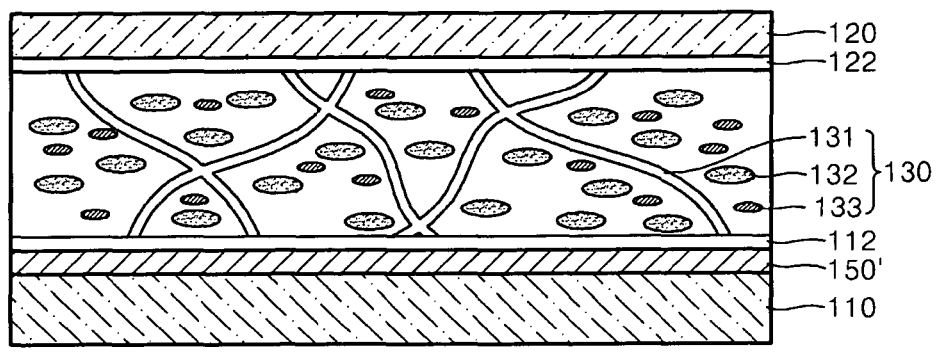
FIG. 3 is a cross-sectional view illustrating a reflective display device according to example embodiments.
Figure 4:
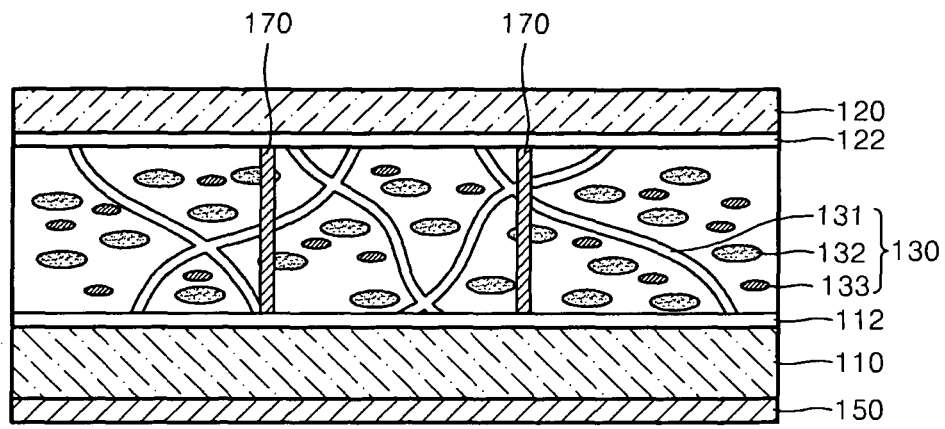
FIG. 4 is a cross-sectional view illustrating a reflective display device according to example embodiments.

In example embodiments, the mirror reflection plate 150 is disposed on the lower surface of the first substrate 110, which is a lower substrate. However, the mirror reflection plate 150 may be disposed on an upper surface of the first substrate 110, as shown in FIG. 3. In detail, FIG. 3 is a cross-sectional view illustrating a reflective display device according to example embodiments. Referring to FIG. 3, a mirror reflection plate 150' is disposed on an upper surface of the first substrate 110. Although not shown in FIG. 3, the mirror reflection plate 150' may alternatively be disposed on upper surfaces of the first electrodes 112. FIG. 4 is a cross-sectional view illustrating a reflective display device according to example embodiments. Referring to FIG. 4, a plurality of barrier walls 170 are disposed between the first substrate 110 and the second substrate 120. The barrier walls 170 may firmly adhere to the first substrate 110 and the second substrate 120 and may maintain an interval between the first and second substrates 110 and 120. The barrier walls 170 may also prevent movement of liquid crystals when flexible substrates are used as the first and second substrates 110 and 120. In this regard, an adhesive material (not shown) is provided on both ends of each of the barrier walls 170, thereby increasing adhesion between the first and second substrates 110 and 120. Although the plurality of barrier walls 170 are disposed in one pixel unit in FIG. 4, example embodiments are not limited thereto and the barrier walls 170 may be disposed between pixel units.

Figure 5:
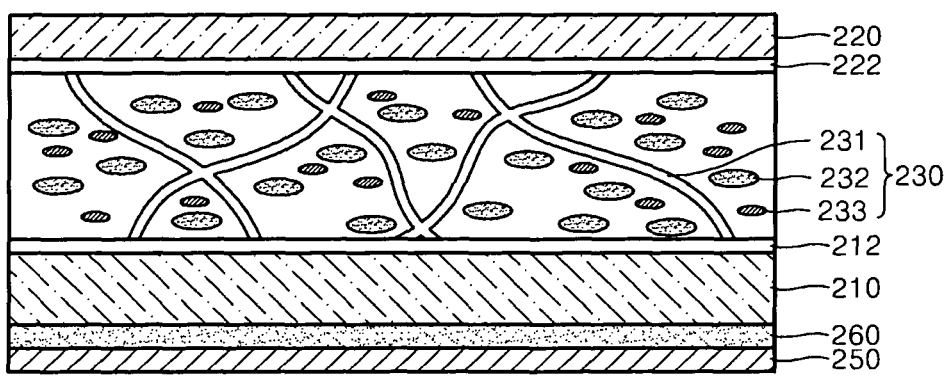
FIG. 5 is a cross-sectional view illustrating a reflective display device according to example embodiments.

FIG. 5 is a cross-sectional view illustrating a reflective display device according to example embodiments. Hereinafter, differences between the example embodiments of FIG. 5 and the above-described example embodiments will be described.

Referring to FIG. 5, the reflective display device according to the current embodiment includes first and second substrates 210 and 220 disposed spaced apart from each other, a plurality of first and second electrodes 212 and 222, a PDLC layer 230, a mirror reflection plate 250, and a phase-difference film disposed between the PDLC layer 230 and the mirror reflection plate 250.

The first electrodes 212 are disposed on an upper surface of the first substrate 210, and the second electrodes 222 are disposed on a lower surface of the second substrate 220. The first and second electrodes 212 and 222 may be formed of a transparent conductive material such as ITO. The PDLC layer 230 is disposed between the first electrodes 212 and the second electrodes 222. A polymer 231, liquid crystals, and black dyes 233 are distributed in the PDLC layer 230. The polymer 231 may have a network structure. The black dyes 233 may be a dichroic dye having an optical anisotropy. The liquid crystal molecules 232 and the black dyes 233 are uniformly distributed in the PDLC layer 230 and may be arranged parallel to the first and second substrates 210 and 220. When a voltage is not applied between the first and second substrates 210 and 220, the liquid crystal molecules 232 and/or the black dyes 233 are arranged parallel to the first and/or second substrates 210 and 220.

The phase-difference film is disposed on a lower surface of the first substrate 210. The phase-difference film may be a ¼ wavelength phase-difference film 260. The mirror reflection plate 250 may be disposed on a lower surface of the ¼ wavelength phase-difference film 260. The mirror reflection plate 250 may be formed of a metal film and/or a film coated with a metal.

In the reflective display device having the above structure, according to example embodiments, when a voltage is not applied between the first and second electrodes 212 and 222, the liquid crystal molecules 232 and/or the black dyes 233 are arranged parallel to the first and second substrates 210 and 220. The black dyes 233 function as a polarizing plate. Accordingly, white light incident from an external light source, and penetrating the black dyes 233 penetrates the ¼ wavelength phase-difference film 260 and is then reflected by the mirror reflection plate 250 and thus penetrates the ¼ wavelength phase-difference film 260 again, thereby generating a phase difference of ½ a wavelength. Since the white light reflected by the mirror reflection plate 250 and thus having the phase difference of ½ a wavelength may be mostly absorbed by the black dyes 133, a characteristic of a black color may be improved. When a voltage is applied between the first electrode 212 and the second electrode 222, since the black dyes 233 are randomly arranged, light of which a phase difference is changed by the ¼ wavelength phase-difference film 260 may be externally emitted with relative ease and thus a reflectivity may be maintained. Accordingly, if the ¼ wavelength phase-difference film 260 is used a contrast ratio may further be improved.

Also, the ¼ wavelength phase-difference film 260 and the mirror reflection plate 250 are disposed on the lower surface of the first substrate 210. However, example embodiments are not limited thereto, and thus the ¼ wavelength phase-difference film 260 and the mirror reflection plate 250 may be disposed on an upper surface of the first substrate 210. Alternatively, the ¼ wavelength phase-difference film 260 may be disposed on the upper surface of the first substrate 210, and the mirror reflection plate 250 may be disposed on the lower surface of the first substrate 210. In addition, as illustrated in FIG. 4, the barrier walls 170 may further be disposed between the first substrate 210 and the second substrate 220.

Figure 6:
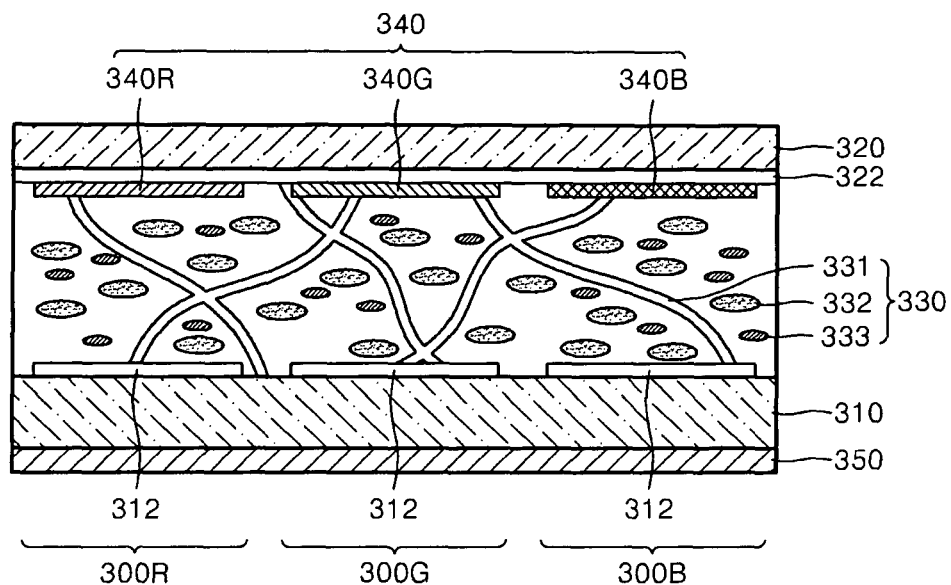
FIG. 6 is a cross-sectional view illustrating a reflective color display device according to example embodiments.

FIG. 6 is a cross-sectional view illustrating a reflective color display device according to example embodiments.

Referring to FIG. 6, the reflective color display device includes a plurality of pixel units. For convenience of description, only one pixel unit is illustrated in FIG. 6. Each of the pixel units is comprised of a plurality of sub-pixels, namely, red, green, and blue sub-pixels 300R, 300G, and 300B, that are different in color. For example, the pixel unit may be comprised of the red, green, and blue sub-pixels 300R, 300G, and 300B.

The reflective color display device includes first and second substrates 310 and 320 disposed spaced apart from each other, a plurality of first and second electrodes 312 and 322 respectively disposed on the first and second substrates 310 and 320, a PDLC layer 330 disposed between the first electrodes 312 and the second electrodes 322, a color filter 340 disposed on the second substrate 320, and a mirror reflection plate 350 disposed on the first substrate 310.

The first and second substrates 310 and 320 may be transparent substrates. The plurality of first electrodes 312 are disposed on an upper surface of the first substrate 310, and the plurality of second electrodes 322 are disposed on a lower surface of the second substrate 320. The first and second electrodes 312 and 322 may be formed of a transparent conductive material such as ITO. When the reflective display device, according to example embodiments, is an AM-type display device, the first electrodes 312 may be formed in a shape corresponding to the red, green, and blue sub-pixels 300R, 300G, and 300B, and the second electrodes 322 may be formed as one body, thereby configuring a common electrode. In this regard, a TFT for switching/driving red, green, and blue sub-pixels 300R, 300G, and 300B is connected to each of the first electrodes 312. Also, when the reflective display device, according to example embodiments, is a passive matrix (PM)-type display device, the first electrodes 312 may be formed parallel to one another in a stripe shape, and the second electrodes 322 may be formed parallel to one another in a stripe shape crossing the first electrodes 312.

The PDLC layer 330 is formed between the first electrodes 312 and the second electrodes 322. A polymer 331, liquid crystals, and black dyes 333 are distributed in the PDLC layer 330. The polymer 331 may have a network structure. The black dyes 333 may be a dichroic dye having an optical anisotropy.

The liquid crystal molecules 332 and the black dyes 333 distributed in the PDLC layer 330 are arranged parallel to the first and second substrates 310 and 320. In detail, when a voltage is not applied between the first and second electrodes 312 and 322, the liquid crystal molecules 332 and the black dyes 322 are arranged parallel to the first and second electrodes 312 and 322. As such, when the liquid crystal molecules 332 are arranged parallel to one another, refractive indexes of the polymer 331 and the liquid crystal molecules 332 are somewhat similar to each other, and thus incident light penetrates the liquid crystal molecules 332 and the polymer 331. The black dyes 333 absorb the incident light. Also, when a predetermined/desired voltage is applied between the first and second electrodes 312 and 322, the liquid crystal molecules 332 and the black dyes 333 are randomly arranged. In this case, external incident light is scattered by the polymer 331 and the liquid crystal molecules 332.

The color filter 340 is disposed on a lower surface of the second electrodes 322. The color filter 340 may include a plurality of color filter layers, for example, red, green, and blue color filter layers 340R, 340G, and 340B, that are different in color and correspond to the red, green, and blue sub-pixels 300R, 300G, and 300B. For example, the color filter 340 may be an RGB color filter comprised of the red, green, and blue color filter layers 340R, 340G, and 340B. Alternatively, the color filter 340 may be disposed between the second substrate 320 and the second electrodes 322.

The mirror reflection plate 350 is disposed on a lower surface of the first substrate 310. In this regard, the mirror reflection plate 350 may be formed of a metal film or a film coated with a metal. The film coated with a metal may be formed of polymer or oxide, or may be formed of any one of various materials. Alternatively, the mirror reflection plate 350 may be disposed on an upper surface of the first substrate 310 or disposed on upper surfaces of the first electrodes 312.

The method of driving the reflective color display device of FIG. 6 is somewhat similar to the method of driving the reflective display device of FIG. 1. For example, in the red sub-pixel 300R, when a voltage is not applied between the first and second electrodes 312 and 322, the liquid crystal molecules 332 and the black dyes 333 are arranged parallel to the first and second substrates 310 and 320. Thus, only red light from among white light incident from an external light source, for example natural light, to the second substrate 320 penetrates the red color filter layer 340R, and the red light penetrates the polymer 331 and the liquid crystal molecules 332. The penetrated red light is reflected by the mirror reflection plate 350 at a given angle and is externally emitted through the second substrate 320. The red light externally emitted is out of the range of a viewing angle of an observer. The red light penetrating the red color filter layer 340R and then being incident on the black dyes 333 is absorbed by the black dyes 333. Thus, the red sub-pixel 300R in which a voltage is not applied between the first and second electrodes 312 and 322 displays a black color.

Next, in the red sub-pixel 300R, when a predetermined/desired voltage is applied between the first and second electrodes 312 and 322, the liquid crystal molecules 332 and the black dyes 333 are randomly arranged. Thus, the red light penetrating the red color filter layer 340R from an external light source is scattered in different directions due to a difference in refractive indexes of the polymer 331 and the liquid crystal molecules 332. The scattered red light is emitted through the second substrate 320, or is reflected by the mirror reflection plate 350 and then is emitted externally through the second substrate 320. Also, the randomly arranged black dyes 333 absorb less amount of light than the black dyes 333 arranged parallel to the first and second substrates 310 and 320. Accordingly, the red sub-pixel 300R in which a voltage is applied between the first and second electrodes 312 and 322 displays a red color.

In the reflective color display device according to example embodiments, the ¼ wavelength phase-difference film 260 of FIG. 5 may be disposed between the PDLC layer 330 and the mirror reflection plate 350. In addition, the barrier walls 170 of FIG. 4 may further be disposed between the first substrate 310 and the second substrate 320. In this case, the barrier walls 170 may be disposed between the red, green, and blue sub-pixels 300R, 300G, and 300B, that is, between the red, green, and blue color filter layers 340R, 340G, and 340B. The ¼ wavelength phase-difference film 260 and the barrier walls 170 have been described above, and thus a detailed description thereof will be omitted here.

According to example embodiments, the RGB color filter comprised of the red, green, blue color filter layers 340R, 340G, and 340B is used as the color filter 340. However, example embodiments are not limited thereto, and a CMY color filter comprised of cyan, magenta, and yellow color filter layers may be used as the color filter 340, and the color filter 340 may include color filter layers of different colors.

Figure 7:
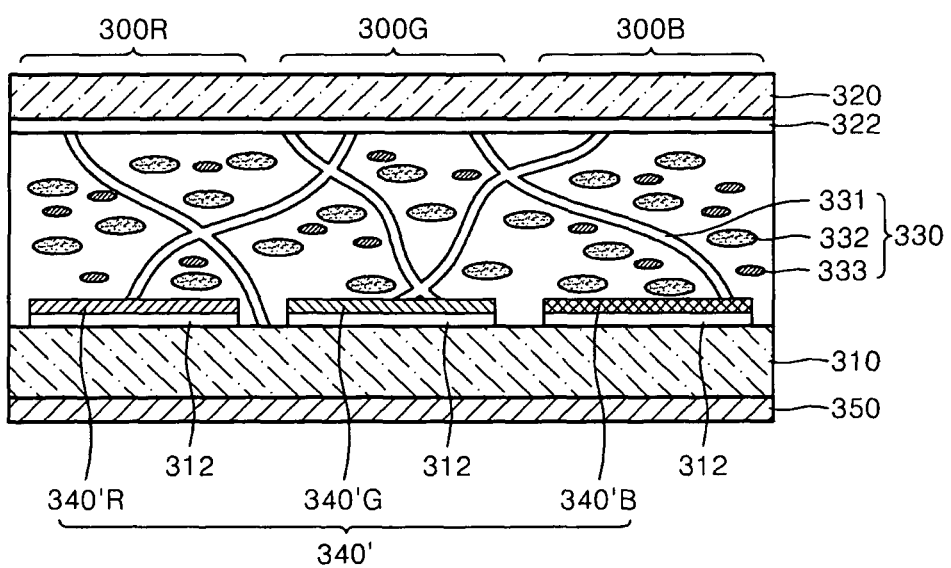
FIG. 7 is a cross-sectional view illustrating a reflective color display device according to example embodiments.

Although the color filter 340 is disposed on the second substrate 320, which is an upper substrate, the color filter 340 may alternatively be disposed on the first substrate 310, which is a lower substrate, as shown in FIG. 7. In detail, FIG. 7 is a cross-sectional view illustrating a reflective color display device according to example embodiments. Referring to FIG. 7, a color filter 340' is disposed on upper surfaces of the first electrodes 312. The, red, green, and blue color filter layers 340'R, 340'G, and 340'B are disposed on the upper surfaces of the respective first electrodes 312. Alternatively, the red, green, and blue color filter layers 340'R, 340'G, and 340'B may be disposed on lower surfaces of the first electrodes 312.

Figure 8:
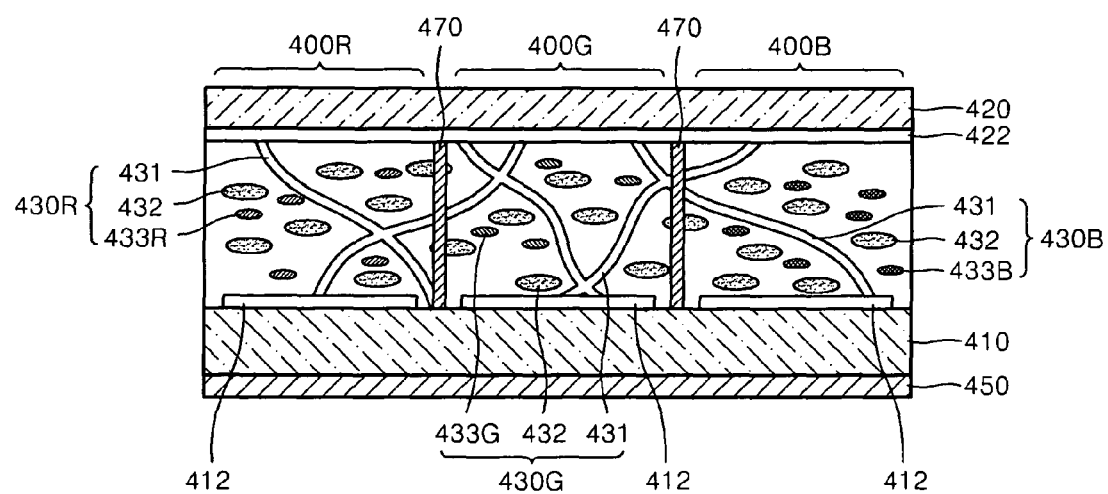
FIG. 8 is a cross-sectional view illustrating a reflective color display device according to example embodiments.

FIG. 8 is a cross-sectional view illustrating a reflective color display device according to example embodiments.

Referring to FIG. 8, the reflective color display device according to example embodiments includes a plurality of pixel units, and each of the pixel units is comprised of sub-pixels, namely, red, green, and blue sub-pixels 400R, 400G, and 400B, that are different in color. For example, the pixel unit may be comprised of the red, green, and blue sub-pixels 400R, 400G, and 400B.

The reflective color display device includes first and second substrates 410 and 420 spaced apart from each other, a plurality of first and second electrodes 412 and 422 respectively disposed on the first and second substrates 410 and 420, a plurality of PDLC layers 430R, 430G, and 430B that are different in color and disposed between the first electrodes 412 and the second electrodes 422, and a mirror reflection plate 450 disposed on a lower surface of the first substrate 410.

The first and second substrates 410 and 420 may be transparent substrates. The plurality of first electrodes 412 are disposed on an upper surface of the first substrate 410, and the plurality of second electrodes 422 are disposed on a lower surface of the second substrate 420. The first and second electrodes 412 and 422 may be formed of a transparent conductive material. When the reflective display device, according to example embodiments, is an AM-type display device, the first electrodes 412 may be formed in a shape corresponding to the red, green, and blue sub-pixels 400R, 400G, and 400B, and the second electrodes 422 is formed as one body, thereby configuring a common electrode. A TFT for switching/driving the red, green, and blue sub-pixels 400R, 400G, and 400B is connected to each of the first electrodes 412. Also, when the reflective display device, according to example embodiments, is a passive matrix (PM)-type display device, the first electrodes 412 may be formed parallel to one another in a stripe shape, and the second electrodes 422 may be formed parallel to one another in a stripe shape crossing the first electrodes 412.

A plurality of PDLC layers 430, which are different in color, are disposed between the first electrodes 412 and the second electrodes 422 so as to correspond to the red, green, and blue sub-pixels 400R, 400G, and 400B. For example, the red, green, and blue PDLC layers 430R, 430G, and 430B may be disposed between the first electrodes 412 and the second electrodes 422. A polymer 431, the liquid crystals, and red dyes 433R are uniformly distributed in the red PDLC layer 430R. The polymer 431, the liquid crystals, and green dyes 433G are uniformly distributed in the green PDLC layer 430G. The polymer 431, the liquid crystals, and blue dyes 433B are uniformly distributed in the blue PDLC layer 430B. The red, green, and blue dyes 433R, 433G, 433B may be a dichroic dye having an optical anisotropy. For example, the red, green, and blue dyes 433R, 433G, 433B may be a fluorescent dichroic dye. The polymer 431 may have a network structure.

The liquid crystal molecules 432 and the red, green, and blue dyes 433R, 433G, and 433B respectively distributed in the red, green, and blue PDLC layers 430R, 430G, and 430B are arranged parallel to the first and second substrates 410 and 420. When a voltage is not applied between the first and second electrodes 412 and 422, the liquid crystal molecules 432 and the red, green, and blue dyes 433R, 433G, 433B are arranged parallel to the first and second electrodes 412 and 422. Also, when a predetermined/desired voltage is applied between the first and second substrates 410 and 420, the liquid crystal molecules 432 and the red, green, and blue dyes 433R, 433G, 433B are randomly arranged.

The mirror reflection plate 450 is disposed on a lower surface of the first substrate 410. The mirror reflection plate 450 may be formed of a metal film or a film coated with a metal. The film coated with a metal may be formed of polymer or oxide, or may be formed of any other suitable materials. Alternatively, the mirror reflection plate 450 may be disposed on an upper surface of the first substrate 410 or on upper surfaces of the first electrodes 412.

A plurality of barrier walls 470 may be disposed between the first substrate 410 and the second substrate 420. The barrier walls 470 prevent the red, green, and blue dyes 433R, 433G, 433B from mixing. Thus, the barrier walls 470 may be disposed between the red, green, and blue sub-pixels 400R, 400G, and 400B, for example, between the red, green, and blue PDLC layers 430R, 430G, and 430B. Also, the barrier walls 470 may firmly adhere to the first substrate 410 and the second substrate 420 and may maintain an interval between the first and second substrates 410 and 420. The barrier walls 470 may also prevent movement of liquid crystals when flexible substrates are used as the first and second substrates 410 and 420. An adhesive material (not shown) is provided on both ends of each of the barrier walls 470, thereby increasing adhesion between the first and second substrates 410 and 420.

In the reflective color display device having the above structure, when a voltage is not applied between the first and second electrodes 412 and 422, the liquid crystal molecules 432 and the red, green, and blue dyes 433R, 433G, 433B are arranged parallel to the first and second substrates 410 and 420. Thus, white light incident from an external light source, for example, natural light penetrates the red, green, and blue PDLC layers 430R, 430G, and 430B. The penetrated white light is reflected by the mirror reflection plate 450 and is emitted to the outside through the second substrate 420. When a predetermined/desired voltage is applied between the first and second electrodes 412 and 422, the liquid crystal molecules 432 and the red, green, and blue dyes 433R, 433G, 433B are randomly arranged, and thus the external white light may display colors by reflecting only a predetermined/desired color of light by the red, green, and blue dyes 433R, 433G, 433B.

In the reflective color display device, according to example embodiments, the ¼ wavelength phase-difference film 260 of FIG. 5 may be disposed between the red, green, and blue PDLC layers 430R, 430G, and 430B and the mirror reflection plate 450. The ¼ wavelength phase-difference film 260 has been described above, and thus a detailed description thereof will be omitted. According to example embodiments, the red, green, and blue PDLC layers 430R, 430G, and 430B were used. However, example embodiments are not limited thereto, and cyan, magenta, and yellow PDLC layers may also be used, or alternatively, various other colors of PDLC layers may be used.

According to example embodiments, a reflective display device having improved reflection properties and a contrast ratio may be obtained using a PDLC layer and a mirror reflection plate.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A reflective display device including a plurality of pixel units, the reflective display device comprising:
   a first substrate and a second substrate apart from each other;
   a plurality of first and second electrodes respectively on the first and second substrates;
   a polymer-dispersed liquid crystal (PDLC) layer between the first and second electrodes and including a polymer, liquid crystals, and black dyes; and
   a mirror reflection plate on the first substrate,
   wherein molecules of the liquid crystals and the black dyes are parallel to the first and second substrates.

2. The reflective display device of claim 1, wherein, when a voltage is applied between the first and second electrodes, the liquid crystal molecules and the black dyes are randomly arranged.

3. The reflective display device of claim 1, wherein the mirror reflection plate is on a lower surface or an upper surface of the first substrate, or is on upper surface of the plurality of first electrodes.

4. The reflective display device of claim 1, further comprising a phase-difference film between the PDLC layer and the mirror reflection plate.

5. The reflective display device of claim 4, wherein the phase-difference film comprises a ¼ wavelength phase-difference film.

6. The reflective display device of claim 1, wherein the mirror reflection plate comprises a metal film or a film coated with a metal.

7. The reflective display device of claim 1, wherein the black dyes comprise a dichroic dye having an optical anisotropy.

8. The reflective display device of claim 1, wherein a plurality of barrier walls are between the first substrate and the second substrate.

9. The reflective display device of claim 8, wherein an adhesive material is on ends of each of the barrier walls.

10. The reflective display device of claim 1, wherein the plurality of first electrodes are discrete structures that correspond to the plurality of pixel units, and the second electrodes are configured as a common electrode.

11. The reflective display device of claim 1, wherein the first and second electrodes are in a stripe shape and cross each other.

12. A reflective display device including a plurality of pixel units, each pixel unit including a plurality of sub-pixels of different color, the reflective display device comprising:
   a first substrate and a second substrate from each other;
   a plurality of first and second electrodes respectively on the first and second substrates;
   a polymer-dispersed liquid crystal (PDLC) layer between the plurality of first and second electrodes and including a polymer, liquid crystals, and black dyes;
   a color filter on at least one of the first and second substrates, the color filter including a plurality of color filter layers of different color and the color filter corresponding to the plurality of sub-pixels; and
   a mirror reflection plate on the first substrate,
   wherein molecules of the liquid crystals and the black dyes are parallel to the first and second substrates.

13. The reflective display device of claim 12, wherein the mirror reflection plate is on a lower surface or an upper surface of the first substrate, or is on an upper surface of the plurality of first electrodes.

14. The reflective display device of claim 12, further comprising a ¼ wavelength phase-difference film between the PDLC layer and the mirror reflection plate.

15. The reflective display device of claim 12, wherein a plurality of barrier walls are between the first substrate and the second substrate.

16. The reflective display device of claim 15, wherein the barrier walls are between the different color filter layers.

17. The reflective display device of claim 12, wherein the color filter is an RGB color filter including red, green, and blue color filter layers or the color filter is a CMY color filter including cyan, magenta, and yellow color filter layers.

18. The reflective display device of claim 12, wherein the plurality of first electrodes are discrete structures corresponding to the plurality of sub-pixels, and the plurality of second electrodes are configured as a common electrode.

19. The reflective display device of claim 12, wherein the first and second electrodes are in a stripe shape and cross each other.

20. A reflective display device including a plurality of pixel units, each pixel unit including a plurality of sub-pixels of different color, the reflective display device comprising:
   a first substrate and a second substrate apart from each other;
   a plurality of first and second electrodes respectively on the first and second substrates;

a plurality of different color polymer-dispersed liquid crystal (PDLC) layers corresponding to the plurality of subpixels, and including polymer, liquid crystals, and dyes of different colors; and a mirror reflection plate on the first substrate, wherein molecules of the liquid crystals and the dyes of different colors are parallel to the first and second substrates.

21. The reflective display device of claim 20, wherein the mirror reflection plate is on a lower surface or an upper surface of the first substrate, or is on an upper surface of the plurality of first electrodes.

22. The reflective display device of claim 20, further comprising a ¼ wavelength phase-difference film between the PDLC layer and the mirror reflection plate.

23. The reflective display device of claim 20, wherein a plurality of barrier walls are between the first substrate and the second substrate, and the barrier walls are between the PDLC layers of different color.

24. The reflective display device of claim 1, wherein, when a voltage is not applied between the first and second electrodes, molecules of the liquid crystals and the black dyes are parallel to the first and second substrate, and when a voltage is applied between the first and second electrodes, the liquid crystal molecules and the black dyes are randomly arranged.

25. The reflective display device of claim 12, wherein, when a voltage is not applied between the first and second electrodes, molecules of the liquid crystals and the black dyes are parallel to the first and second substrate, and when a voltage is applied between the first and second electrodes, the liquid crystal molecules and the black dyes are randomly arranged.

26. The reflective display device of claim 20, wherein, when a voltage is not applied between the first and second electrodes, molecules of the liquid crystals and the dyes of different colors are parallel to the first and second substrate and, when a voltage is applied between the first and second electrodes, the liquid crystal molecules and the dyes of different colors are randomly arranged.

* * * * *